(12) United States Patent
Chen et al.

(10) Patent No.: US 12,227,143 B2
(45) Date of Patent: Feb. 18, 2025

(54) SEAT BELT APPARATUS, VEHICLE SEAT, AND VEHICLE

(71) Applicant: Shenzhen Yinwang Intelligent Technologies Co., Ltd., Shenzhen (CN)

(72) Inventors: Mingjun Chen, Shenzhen (CN); Jian Sun, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/641,822

(22) Filed: Apr. 22, 2024

(65) Prior Publication Data

US 2024/0270199 A1 Aug. 15, 2024

Related U.S. Application Data

(63) Continuation of application No. PCT/CN2022/103078, filed on Jun. 30, 2022.

(30) Foreign Application Priority Data

Oct. 22, 2021 (CN) .......................... 202122562948.4

(51) Int. Cl.
B60R 22/26 (2006.01)
B60R 22/02 (2006.01)
(52) U.S. Cl.
CPC ........ B60R 22/26 (2013.01); *B60R 2022/027* (2013.01)

(58) Field of Classification Search
CPC .......................... B60R 22/26; B60R 2022/027
See application file for complete search history.

(56) References Cited

U.S. PATENT DOCUMENTS

| | | | | |
|---|---|---|---|---|
| 6,592,166 B2* | 7/2003 | Motozawa | ............... | B60N 2/80 296/68.1 |
| 6,644,723 B2* | 11/2003 | Motozawa | ............... | B60R 22/02 296/68.1 |
| 7,510,246 B2* | 3/2009 | Gruninger | ............... | B60R 22/00 297/485 |
| 7,775,557 B2* | 8/2010 | Bostrom | ............... | B60R 22/343 280/808 |
| 9,758,066 B2 | 9/2017 | Gallagher et al. | | |
| 10,946,829 B2* | 3/2021 | Viano | ................... | B60R 22/26 |

(Continued)

FOREIGN PATENT DOCUMENTS

| | | |
|---|---|---|
| CN | 202427075 U | 9/2012 |
| CN | 107650857 A | 2/2018 |

(Continued)

*Primary Examiner* — Faye M Fleming
(74) *Attorney, Agent, or Firm* — Conley Rose, P.C.

(57) ABSTRACT

A seat belt apparatus includes a main belt, a first buckle that is disposed on an extended part of the main belt and that can be buckled and fastened to a second side of the vehicle seat corresponding to a waist on the other side of the passenger, and an auxiliary belt extending from a second part of a backrest of the vehicle seat corresponding to an underarm of the passenger, where the second part is lower than the first part. The apparatus is configured such that in the event a body of the passenger slides forward relative to the vehicle seat, the underarm of the passenger is blocked by the auxiliary belt.

20 Claims, 14 Drawing Sheets

(56) References Cited

U.S. PATENT DOCUMENTS

| | | | |
|---|---|---|---|
| 11,679,736 B2* | 6/2023 | Lane | B60R 22/023 |
| | | | 280/808 |
| 2002/0195832 A1 | 12/2002 | Motozawa | |
| 2011/0089744 A1* | 4/2011 | Singla Casasayas | B60R 22/18 |
| | | | 280/801.1 |
| 2014/0138942 A1* | 5/2014 | Rouhana | B60R 22/02 |
| | | | 280/807 |
| 2018/0079341 A1* | 3/2018 | Nishimura | B60R 22/023 |
| 2022/0153225 A1* | 5/2022 | Hicke | B60R 22/02 |
| 2022/0324402 A1* | 10/2022 | Einspahr | B60R 22/26 |
| 2023/0415695 A1* | 12/2023 | Kerkeling | B60R 21/01552 |

FOREIGN PATENT DOCUMENTS

| | | |
|---|---|---|
| CN | 108725375 A | 11/2018 |
| CN | 109011254 A | 12/2018 |
| JP | 2002362206 A | 12/2002 |

\* cited by examiner

SEAT BELT APPARATUS, VEHICLE SEAT, AND VEHICLE

CROSS-REFERENCE TO RELATED APPLICATIONS

This is a continuation of International Patent Application No. PCT/CN2022/103078 filed on Jun. 30, 2022, which claims priority to Chinese Patent Application No. 202122562948.4 filed on Oct. 22, 2021. The disclosures of the aforementioned applications are hereby incorporated by reference in their entireties.

TECHNICAL FIELD

This disclosure relates to the field of vehicle technologies, and in particular, to a seat belt apparatus, a vehicle seat, and a vehicle.

BACKGROUND

To effectively protect a passenger when a vehicle collides, a seat belt apparatus is usually provided on a vehicle seat. As a common form of the seat belt apparatus, the seat belt apparatus has a belt obliquely extending, and the belt obliquely extends from a shoulder on one side of the passenger to a waist on the other side. However, sometimes, to ride comfortably, the passenger adjusts a backrest of the vehicle seat to a backward tilting state. In this case, if a forward collision of the vehicle occurs, a body of the passenger slides forward. Because a neck of the passenger is close to a part that is of the seat belt apparatus and that extends from the shoulder, the part may strangle the neck of the passenger, causing great damage to the passenger.

SUMMARY

This disclosure provides a seat belt apparatus, a vehicle seat, a vehicle, and the like. This can reduce a risk of damage to a passenger and improve safety.

A first aspect of this disclosure provides a seat belt apparatus, including a first belt extending from a first part of an upper part of a vehicle seat, where the first part is located on a first side in a width direction of the vehicle seat, a first buckle disposed on a part that is of the first belt and that extends from the first part, where the first buckle can be buckled and fastened to a first fastening part, and the first fastening part is disposed on a lower part of a second side in the width direction of the vehicle seat, and a second belt extending from a second part of a backrest of the vehicle seat, where the second part is located on an upper part of the first side of the backrest and is lower than the first part.

According to the foregoing structure, the seat belt apparatus has the second belt, the second belt extends from the second part on the second side of the upper part of the backrest, and the second part is lower than the first part, namely, an extended part of the first belt. Therefore, the second belt can restrain a passenger under an underarm of the passenger. For example, when a body of the passenger slides forward relative to the vehicle seat due to a forward collision of a vehicle, the underarm of the passenger is blocked by an auxiliary belt, so that forward sliding of the passenger can be suppressed. Further, a risk that a neck of the passenger is strangled by a main belt can be reduced, and safety can be improved.

The first part corresponds to a shoulder on a side of the passenger and is an extension point of the main belt when viewed from the front of the vehicle seat. The point includes a pull-out point and a fastening point, and also includes a "pass-through point".

A scenario of the pull-out point is that a retractor is disposed inside the seat, a position of the retractor is lower than that of an upper part of the seat (or a "shoulder"), an opening is provided in the upper part of the seat, and the main belt extends out of the seat through the opening.

A scenario of the fastening point is that an upper end of the main belt is fastened to the upper part of the seat.

A scenario of the pass-through point is that the main belt extends out of the seat through a rear surface opening of the backrest of the seat, and then extends upward and forward across an upper part of the backrest. An upper part through which the main belt passes includes the pass-through point and the first part.

In a possible implementation of the first aspect, the seat belt apparatus further includes a second buckle disposed on a part that is of the second belt and that extends from the second part, where the second buckle can be buckled and fastened to a second fastening part, and the second fastening part is disposed on the second side of the backrest and has the same height as the second part.

According to the foregoing structure, the second buckle can be buckled and fastened to the second fastening part, so that the second belt is arranged under two sides of underarms of the passenger. In this way, forward sliding of the passenger can be effectively suppressed.

In a possible implementation of the first aspect, the seat belt apparatus further includes a first connecting mechanism through which the first belt and the second belt are connected.

According to the foregoing structure, because the first belt and the second belt are connected, the first belt and the second belt can hold each other's positions. In this way, the seat belt apparatus can reliably restrain a body of the passenger.

In a possible implementation of the first aspect, the seat belt apparatus further includes a second connecting mechanism through which the first belt and the second belt are connected.

According to the foregoing structure, the second belt can suppress forward sliding of a body of the passenger. In addition, because the second belt is connected to the first belt, the second belt can pull the first belt to move in a direction the same as a direction of sliding of the passenger when the second belt is subjected to a force of the forward sliding of the body of the passenger. This effectively reduces a risk that the first belt strangles a neck of the passenger.

In a possible implementation of the first aspect, the second connecting mechanism can slide on the first belt.

According to the foregoing structure, the second connecting mechanism can slide on the first belt, so that passengers of different heights and body shapes can be adapted and riding comfort can be improved.

In a possible implementation of the first aspect, the second connecting mechanism includes a locking part for locking a sliding position of the second connecting mechanism relative to the first belt.

According to the foregoing structure, the position of the second connecting mechanism can be locked through the locking part to keep the second connecting mechanism in an adjusted position. This avoids reduction of riding comfort.

In the foregoing structure, the second connecting mechanism can be effectively locked in an adjusted sliding position.

In a possible implementation of the first aspect, the first belt and the second belt are detachably connected.

According to the foregoing structure, the passenger can wear only the first band instead of the second band, to improve use convenience.

In a possible implementation of the first aspect, the first side is a side close to a window, and the second side is a side away from the window.

To be specific, the second belt extends from the side close to the window (the outside of a vehicle) to the side away from the window (the inside of a vehicle). In this way, compared with configuration of the second belt extending from the side away from the window to the side close to the window, configuration of the second belt extending from the side close to the window to the side away from the window can prevent the second belt from interfering with operation (for example, opening an armrest box lid, taking and placing an item, or operating on a gear lever by a driver) performed by the passenger on various mechanisms on a center console.

In a possible implementation of the first aspect, an end of the part that is of the first belt and that extends from the first part is fastened to a third part of the vehicle seat, and the third part is located on a lower part of the first side of the vehicle seat.

Thus, when the first buckle is buckled and fastened to the first fastening part, the first belt forms an obliquely extending part and a waist-abdomen restraining part. The obliquely extending part extends from a shoulder on one side of the passenger to a waist on the other side, and the waist-abdomen restraining part extends from a waist on one side to a waist on the other side, so that a body of the passenger can be restrained well.

In a possible implementation of the first aspect, the seat belt apparatus further includes a first retractor disposed in the vehicle seat for fastening an end of the first belt.

In a possible implementation of the first aspect, the seat belt apparatus further includes a second retractor disposed in the vehicle seat for fastening an end of the second belt.

According to the foregoing structure, when the second belt is not worn, the second belt is retracted by the retractor and stored in the vehicle seat. This can avoid entanglement with the first belt or the like.

In a possible implementation of the first aspect, the second belt extends out of the vehicle seat from a side surface on the first side of the backrest or a part that is on a back surface and that is close to a side surface on the first side.

In a possible implementation of the first aspect, the second belt is set to extending obliquely upward from the first side to the second side at an included angle with a horizontal direction greater than 0 degrees and less than 90 degrees when being worn.

In this way, a risk that the first belt strangles a neck of the passenger can be more effectively reduced.

In a possible implementation of the first aspect, the included angle falls within a range of 0 degrees to 70 degrees.

In this way, a risk that the first belt strangles a neck of the passenger can be more effectively reduced. Further, when the included angle is less than 20 degrees, the second belt is approximately horizontally arranged. This is unfavorable to exert a function of pulling the first belt. When the included angle is greater than 70 degrees, a connection point between the second belt and the first belt is closer to a shoulder of the passenger and far from a part that the first belt is most likely to strangle the neck (that is, the part is roughly a part closest to the neck). This is also unfavorable to exert a function of pulling the first belt. Therefore, a risk that the first belt strangles the neck of the passenger can be more effectively reduced by setting the included angle within the range of 20 degrees to 70 degrees.

In a possible implementation of the first aspect, the second belt extends from the first side to the first belt and then is folded back around the first belt, and a folded-back end is fastened to the backrest.

According to the foregoing structure, the second belt can be connected to the first belt without having to provide a special connecting mechanism. This reduces manufacturing costs.

According to a concept of this disclosure, a solution in the following expression manner may be further obtained. The seat belt apparatus includes a first belt extending from a first part of a vehicle seat corresponding to a shoulder on one side of a passenger, a first buckle that is disposed on an extended part of a main belt and that can be buckled and fastened to a part of the vehicle seat corresponding to a waist on the other side of the passenger, and an auxiliary belt extending from a second part of a backrest of the vehicle seat corresponding to an underarm of the passenger, where the second part is lower than the first part.

A second aspect of this disclosure provides a vehicle seat, including a first part located on an upper part of the vehicle seat and on a first side in a width direction of the vehicle seat, where a first belt of a seat belt apparatus can extend from the first part, a first fastening part that is disposed on a lower part of a second side in the width direction of the vehicle seat and that can buckle and fasten a first buckle, where the first buckle is disposed on a part that is of the first belt and that extends from the first part, and a second part located on an upper part of the first side of a backrest of the vehicle seat and lower than the first part, where a second belt of the seat belt apparatus can extend from the second part.

The vehicle seat may be a driver seat, a front passenger seat, or another seat disposed behind the driver seat or the front passenger seat, for example, a second-row seat, a third-row seat, or the like. When the vehicle seat is a seat with a plurality of places connected together, structural elements for configuring the seat belt apparatus can be set by taking a place as a unit, and corresponding seat belt apparatuses can be configured by taking the place as a unit. A structure of a seat belt apparatus of each unit may be the same or different.

The vehicle seat of the second aspect is used. Same technical effects as that of the first aspect can be obtained, and details are not described herein again.

In a possible implementation of the second aspect, the vehicle seat further includes a second fastening part that is disposed on the second side of the backrest, has the same height as the second part, and is configured to buckle and fasten a second buckle, where the second buckle is disposed on a part that is of the second belt and that extends from the second part.

In a possible implementation of the second aspect, the vehicle seat further includes a third fastening part disposed on the first side of the vehicle seat and configured to fasten an end of the part that is of the second belt and that extends from the second part.

According to the foregoing structure, when the second belt is not worn, the second belt can be fastened to the third fastening part. For example, the second belt can be prevented from moving freely and being entangled with the first belt.

In a possible implementation of the second aspect, the vehicle seat further includes the seat belt apparatus in any one of the foregoing solutions.

A third aspect of this disclosure provides a vehicle, including the seat belt apparatus in any one of the foregoing solutions or the vehicle seat in any one of the foregoing solutions.

DESCRIPTION OF EMBODIMENTS

Figure 14:
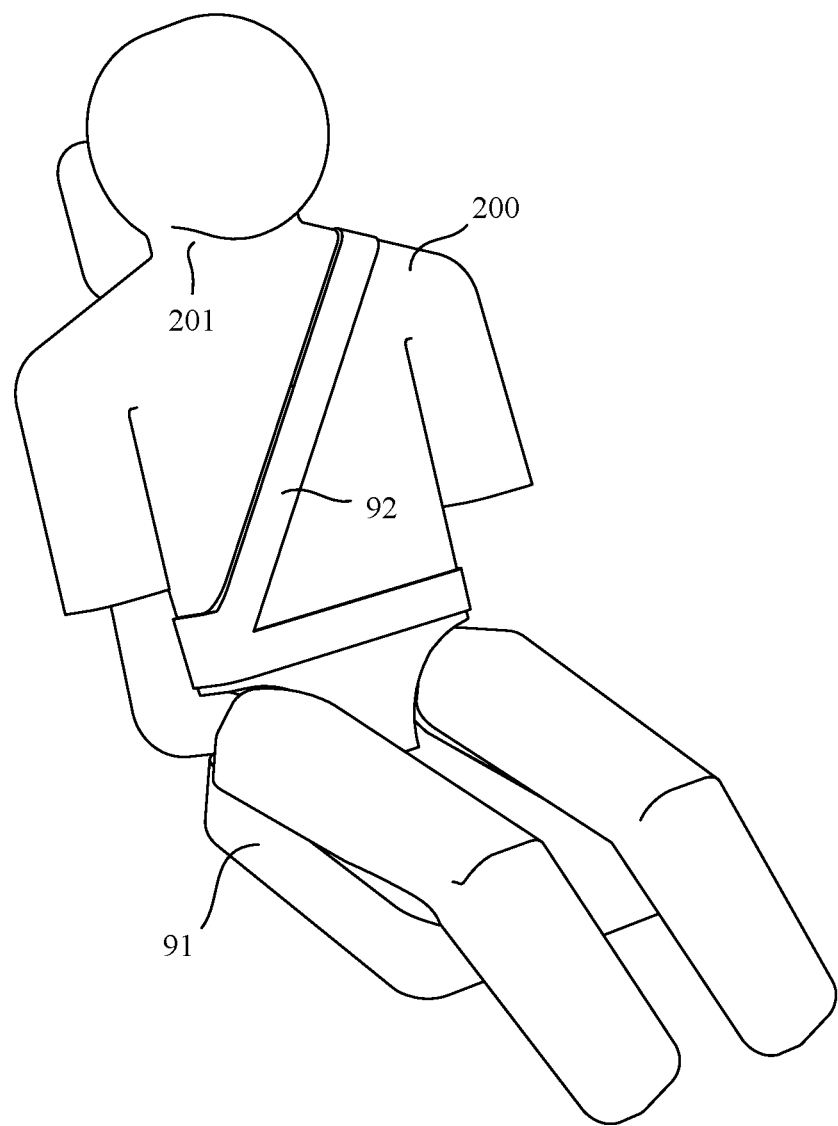
FIG. 14 is an illustrative schematic diagram of an existing seat belt apparatus.

A seat belt apparatus on a vehicle seat typically has a belt extending obliquely from a shoulder on one side of a passenger to the vicinity of a waist on the other side, and an example of such a seat belt apparatus is shown in FIG. 14. In the example shown in FIG. 14, the seat belt apparatus is a so-called three-point seat belt worn by a passenger 200 sitting on a vehicle seat 91, to be able to restrain a position of the passenger 200 and reduce damage to the passenger 200 caused when a vehicle collides or the like. Sometimes, to ride comfortably, the passenger 200 adjusts a backrest of the vehicle seat 91 to a backward tilting state. In this case, if a forward collision of the vehicle occurs, a body of the passenger 200 slides forward. Because a neck 201 of the passenger 200 is close to a part that is of a seat belt apparatus 92 and that extends from the shoulder, the part may strangle the neck 201 of the passenger 200, causing great damage to the passenger 200. This is particularly serious when the backrest is lowered.

Therefore, embodiments of this disclosure provide a seat belt apparatus, a vehicle seat, a vehicle, and the like, to reduce a risk of damage to a passenger and improve safety.

Figure 1:
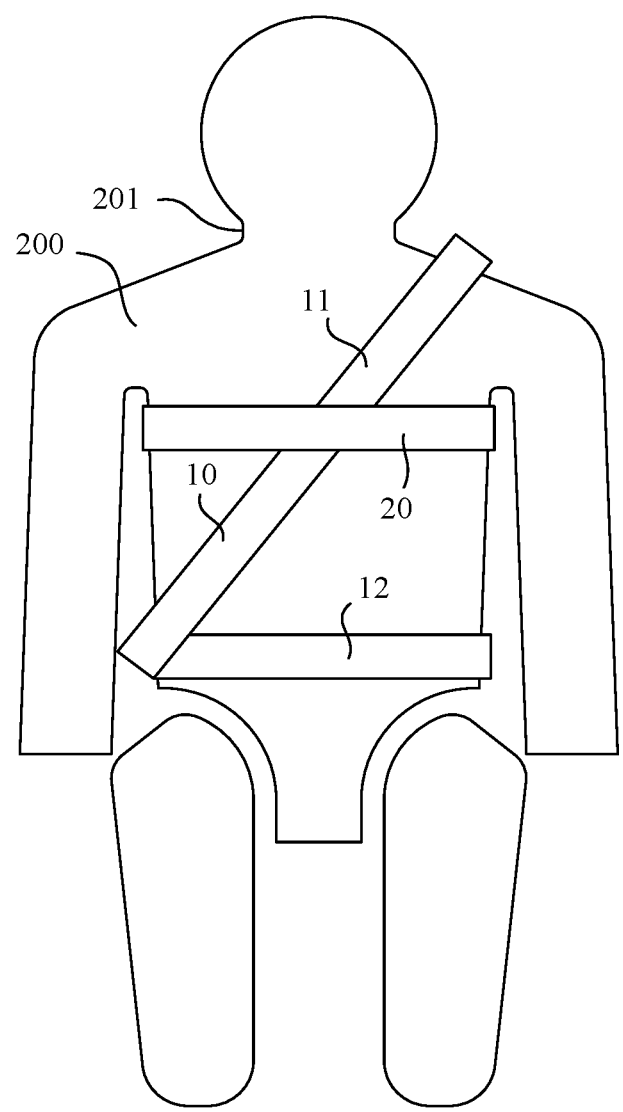
FIG. 1 is an illustrative schematic diagram of a seat belt apparatus according to an embodiment of this disclosure.
Figure 2:
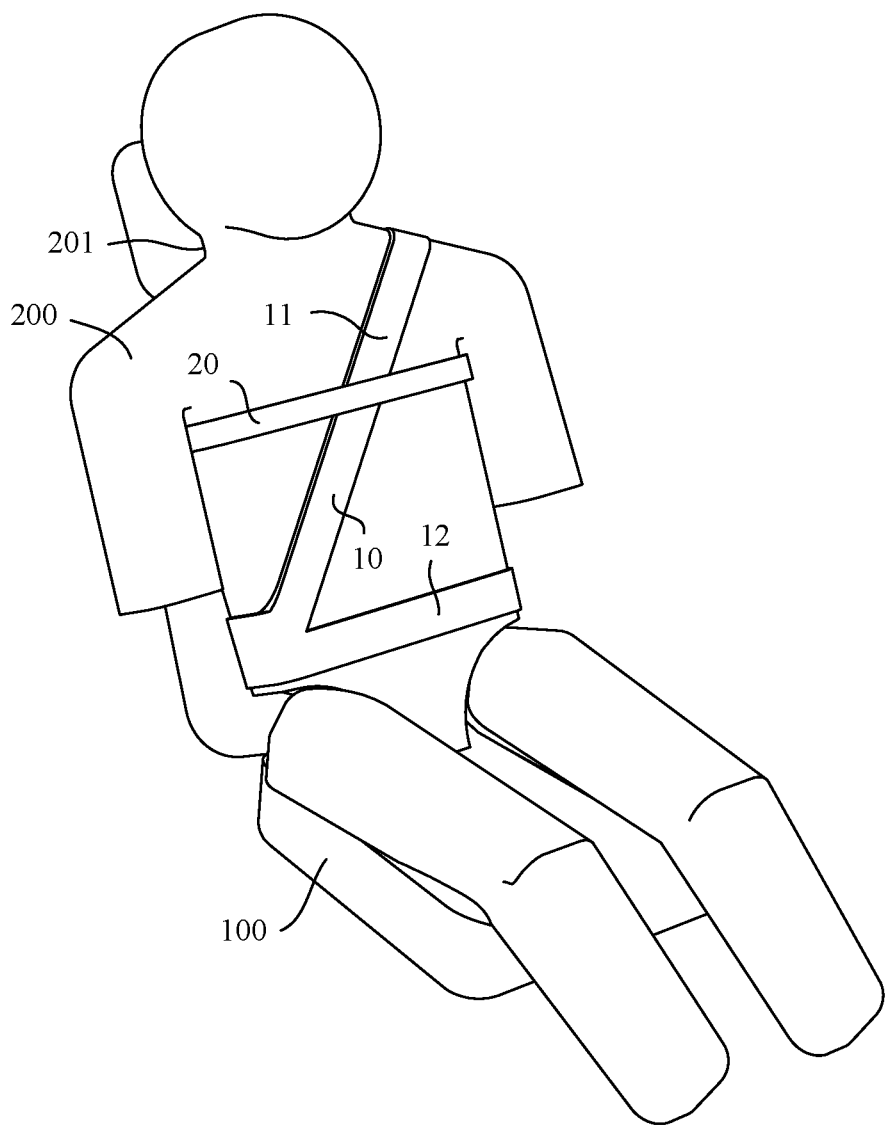
FIG. 2 is another illustrative schematic diagram of the foregoing seat belt apparatus.
Figure 3:
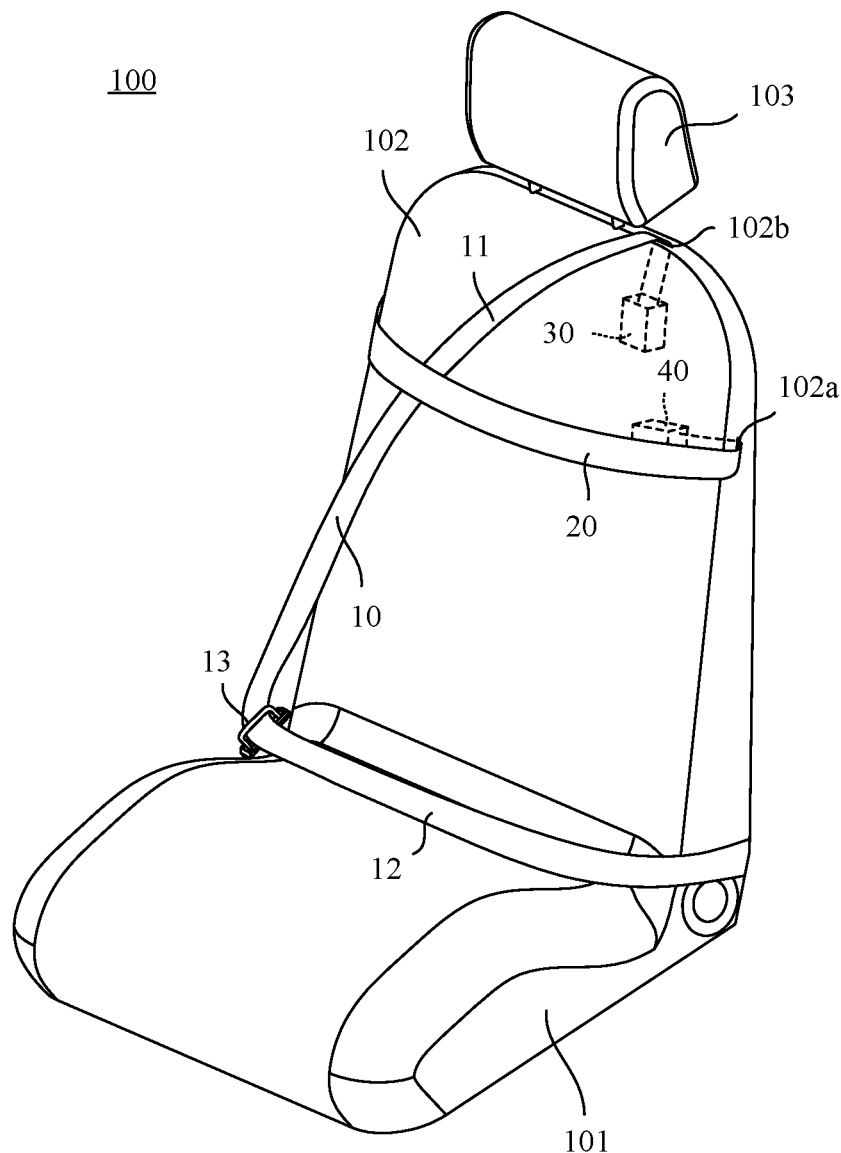
FIG. 3 is an illustrative schematic diagram of a vehicle seat according to an embodiment of this disclosure.
Figure 4:
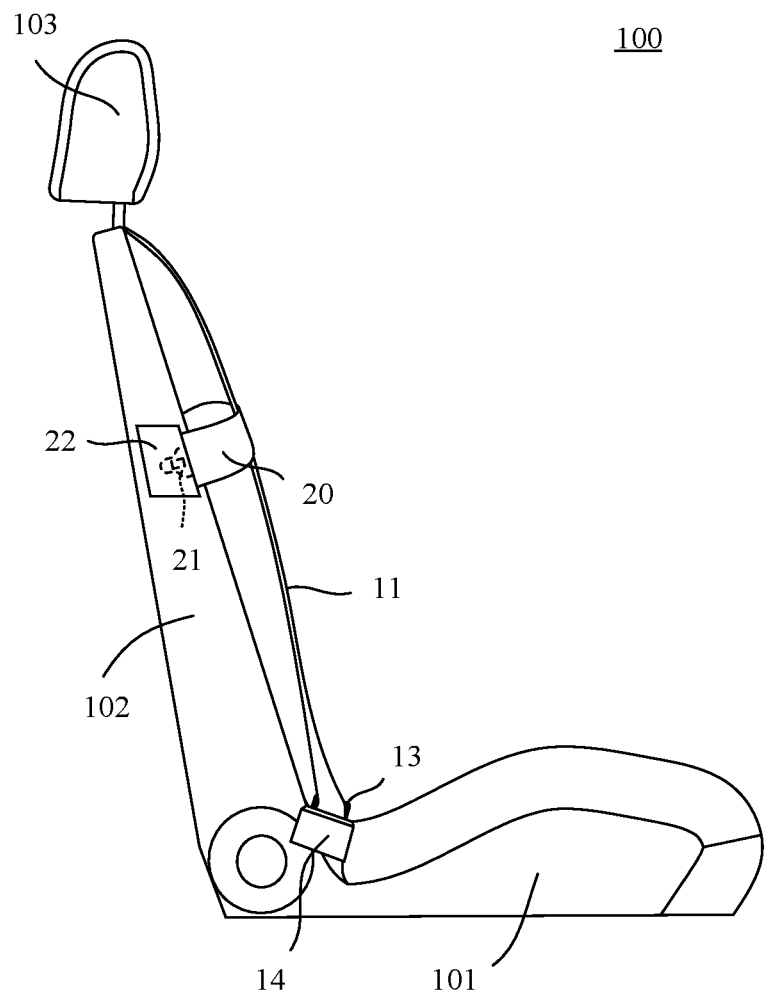
FIG. 4 is another illustrative schematic diagram of the foregoing vehicle seat.

FIG. 1 is an illustrative schematic diagram of a seat belt apparatus according to an embodiment of this disclosure, FIG. 2 is another illustrative schematic diagram of the foregoing seat belt apparatus, FIG. 3 is an illustrative schematic diagram of a vehicle seat according to an embodiment of this disclosure, and FIG. 4 is another illustrative schematic diagram of the foregoing vehicle seat. The vehicle seat has the seat belt apparatus shown in FIG. 1 and FIG. 2. The seat belt apparatus and vehicle seat provided herein are described below with reference to FIG. 1 to FIG. 4. In addition, it may be understood that embodiments of this disclosure can further provide a vehicle that includes a seat belt apparatus and a vehicle seat.

In the following description, front-rear, left-right, and up-down directions are defined from a perspective of a passenger sitting on a vehicle seat. However, this is intended for ease of description and cannot be construed as a limitation on this disclosure. In addition, the left-right direction is consistent with a width direction of the vehicle seat, the up-down direction is consistent with a height direction of the vehicle seat, and the front-rear direction is consistent with a front-rear direction of the vehicle seat.

As shown in FIG. 1 and FIG. 2, the seat belt apparatus has a main belt 10 (corresponding to a first belt in this disclosure) and an auxiliary belt 20 (corresponding to a second belt in this disclosure).

When being worn, the main belt 10 has an obliquely extending part 11 and a waist-abdomen restraining part 12. The obliquely extending part 11 extends obliquely from a shoulder on one side (a left side in an example of FIG. 1) of a passenger 200 to the vicinity of a waist on the other side (a right side in the example of FIG. 1). The waist-abdomen restraining part 12 extends from a waist on one side of the passenger to the waist on the other side in a left-right direction.

Further, in this embodiment, the left side of the passenger 200 and a vehicle seat 100 is an outside side in a width direction of a vehicle and a side close to a window. Correspondingly, the right side is an inside side in the width direction of the vehicle and a side away from the window. That is, structural elements disposed on the left side are disposed on a side near the window of the vehicle seat 100, and structural elements disposed on the right side are disposed on a side away from the window of the vehicle seat 100. In another possible embodiment, left-right positions of these structural elements may also be reversed.

In addition, the vehicle seat 100 may be a driver seat, a front passenger seat, or another seat disposed behind the driver seat or the front passenger seat, for example, a second-row seat, a third-row seat, or the like. When the vehicle seat 100 is a seat with a plurality of places connected together, structural elements for configuring the seat belt apparatus can be set by taking a place as a unit, and corresponding seat belt apparatuses can be configured by taking the place as a unit. A structure of a seat belt apparatus of each unit may be the same or different.

When the auxiliary belt 20 is worn, a height of the auxiliary belt 20 is substantially consistent with a height of an underarm of the passenger 200, and the auxiliary belt 20 extends from one underarm of the passenger 200 to the other underarm of the passenger 200. In this way, for example, when a forward collision of the vehicle occurs, a body of the passenger 200 slides forward, and an underarm of the passenger 200 is blocked by the auxiliary belt 20, so that forward sliding of the passenger 200 can be suppressed. Further, a risk that a neck 201 of the passenger 200 is strangled by the obliquely extending part 11 of the main belt 10 can be reduced, and safety can be improved.

Optionally, one end of the auxiliary belt 20 is always fastened to one side in a left-right direction (namely, a width direction) of a backrest of the vehicle seat, and the other end is detachably fastened to the other side in the left-right direction of the backrest when the auxiliary belt 20 is used (that is, is worn). In another example, the auxiliary belt 20 may also be made of an elastic and retractable belt, and both ends of the belt are always fastened to the backrest. The passenger 200 puts the auxiliary belt 20 over a body (or a torso) by using extension of the auxiliary belt 20 during use.

Materials of the main belt 10 and the auxiliary belt 20 may be woven fabric, and other materials may also be selected.

In addition to the main belt 10 and the auxiliary belt 20, the seat belt apparatus may also conceptually include structural elements such as a retractor, a buckle tongue, a locking buckle, and the like. These structural elements can be further understood in the following description of the vehicle seat with reference to FIG. 3 and FIG. 4.

The following describes a vehicle seat according to an embodiment of this disclosure with reference to FIG. 3 and FIG. 4, and further describes a structure of the seat belt apparatus.

As shown in FIG. 3 and FIG. 4, the vehicle seat 100 in this embodiment includes the seat belt apparatus shown in FIG. 1 and FIG. 2, and the structure described above with reference to FIG. 1 and FIG. 2 is not repeated here.

In addition, the vehicle seat 100 has a cushion (or a seat cushion) 101, a backrest 102, and a headrest 103. The cushion 101 is mainly configured to support buttocks of a passenger. The backrest 102 is connected to a rear part of the cushion 101 to tilt forward and backward, and is mainly configured to support a back of the passenger. In addition, an angle of the backrest 102 relative to the cushion 101 may be adjusted by a backrest angle adjustment mechanism (not indicated). For example, the backrest 102 may be tilted forward, backward, or lowered. The headrest 103 is mounted on the top of the backrest 102 and is mainly configured to support a head and neck of the passenger.

The cushion 101, the backrest 102, and the headrest 103 belong to a seat body. In addition to the seat body, the vehicle seat 100 may further include other structural elements, such as a seat guide rail disposed between a vehicle floor and the seat body.

As shown in FIG. 3, a retractor 30 and a retractor 40 are mounted inside the backrest 102. The retractor 30 is connected to an upper end of the main belt 10 for winding the main belt 10. A lower end of the main belt 10 is fastened to the vicinity of a right lower part of the backrest 102. Further, the lower end of the main belt 10 may be fastened to a right side surface of the backrest 102, or may be fastened to a position on a back surface and near a right side surface of the backrest 102. The retractor 40 is connected to a left end of the auxiliary belt 20 for winding the auxiliary belt 20.

Further, an opening 102b is provided on a left side of an upper surface of the backrest 102. The main belt 10 extends from the inside of the backrest 102 out of the backrest 102 through the opening 102b. The opening 102b is located in a left-hand position of an upper part of the backrest 102 in a left-right direction, and is more left-hand than a position of the headrest 103 in this embodiment.

In another embodiment, the retractor 30 may not be disposed inside the backrest 102. For example, the retractor 30 is disposed below the cushion 101, and may be fastened to a lower surface of the cushion 101, or may be fastened to a seat guide rail of the vehicle seat 100. At this time, the opening 102b may be omitted, and the main belt 10 extends forward from a rear side of the backrest 102 via the upper surface. Here, a part on the upper surface through which the main belt 10 passes and the foregoing opening 102b correspond to a "first part" in this disclosure.

Further, in another embodiment, the retractor 30 may be connected to the lower end of the main belt 10, and the upper end of the main belt 10 is fastened to, for example, the upper surface of the backrest 102. In this case, a part on the upper surface for fastening the main belt 10 also corresponds to the "first part" in this disclosure.

Further, in another embodiment, an opening may be provided in an upper part of a left side surface of the backrest 102, and the main belt extends out of the backrest 102 through the opening. The opening also corresponds to the "first part" in this disclosure.

An opening 102a is provided on the left side surface of the backrest 102, and the auxiliary belt 20 extends out of the backrest 102 through the opening 102a. It can be understood that a position of the opening 102a in a height direction of the vehicle seat 100 is lower than that of the "first part" (for example, the opening 102b), and the opening 102a is further provided on a part corresponding to an underarm of the passenger 200. In addition, the part is the upper part of the backrest 102 (for example, a part above a central part in an up-down direction).

Here, the opening 102a corresponds to a "second part" in this disclosure.

As shown in FIG. 4, a fastening part 22 is disposed on a right side surface of the backrest 102, and a position of the fastening part 22 in an up-down direction is substantially consistent with that of the opening 102a. In this embodiment, the fastening part 22 is of a locking buckle structure. In addition, a buckle 21 is fastened to a right end of the auxiliary belt 20. In this embodiment, the buckle 21 is of a buckle tongue structure. The buckle 21 can be buckled and fastened to the fastening part 22, so that the auxiliary belt 20 is kept in a state extending in a left-right direction to restrain a torso of the passenger 200.

When buckling and fastening of the buckle 21 on the fastening part 22 is released, the auxiliary belt 20 can be retracted by the retractor 40 and most of the auxiliary belt 20 can be stored inside the backrest 102. The buckle 21 is blocked by a part that is of the backrest 102 and that is located at the periphery of the opening 102a, and is left outside the backrest 102.

As shown in FIG. 3 and FIG. 4, a buckle 13 is disposed on the main belt 10, and the buckle 13 is further disposed on a part that is of the main belt 10 and that extends through the opening 102b. In this embodiment, the buckle 13 can slide freely on the main belt 10. In addition, the buckle 13 is of a buckle tongue structure. As shown in FIG. 4, a fastening part 14 is fastened to the vicinity of a right lower part of the backrest 102, and the buckle 13 can be buckled and fastened to the fastening part 14, so that the main belt 10 forms the obliquely extending part 11 and the waist-abdomen restraining part 12. In this embodiment, corresponding to the structure of the buckle 13, a structure of the fastening part 14 is a locking buckle structure.

When buckling and fastening of the buckle 13 on the fastening part 14 is released, the main belt 10 can be retracted by the retractor 30, and a part of the main belt 10 enters the backrest 102, and a part left outside the backrest 102 extends substantially vertically between the opening 102b and a fastening part on a lower side of the backrest 102.

The foregoing vehicle seat 100 is used, a same technical effect of the foregoing seat belt apparatus can be obtained. This is not described in detail herein.

In addition, in FIG. 3 and FIG. 4, the vehicle seat 100 includes a seat belt apparatus. However, it may be understood that the vehicle seat 100 may not include a seat belt apparatus (the main belt 10, the auxiliary belt 20, and the like) as an intermediate product form, but the vehicle seat 100 has corresponding parts (for example, the opening 102a and the opening 102b) necessary for configuring the seat belt apparatus.

Figure 5:
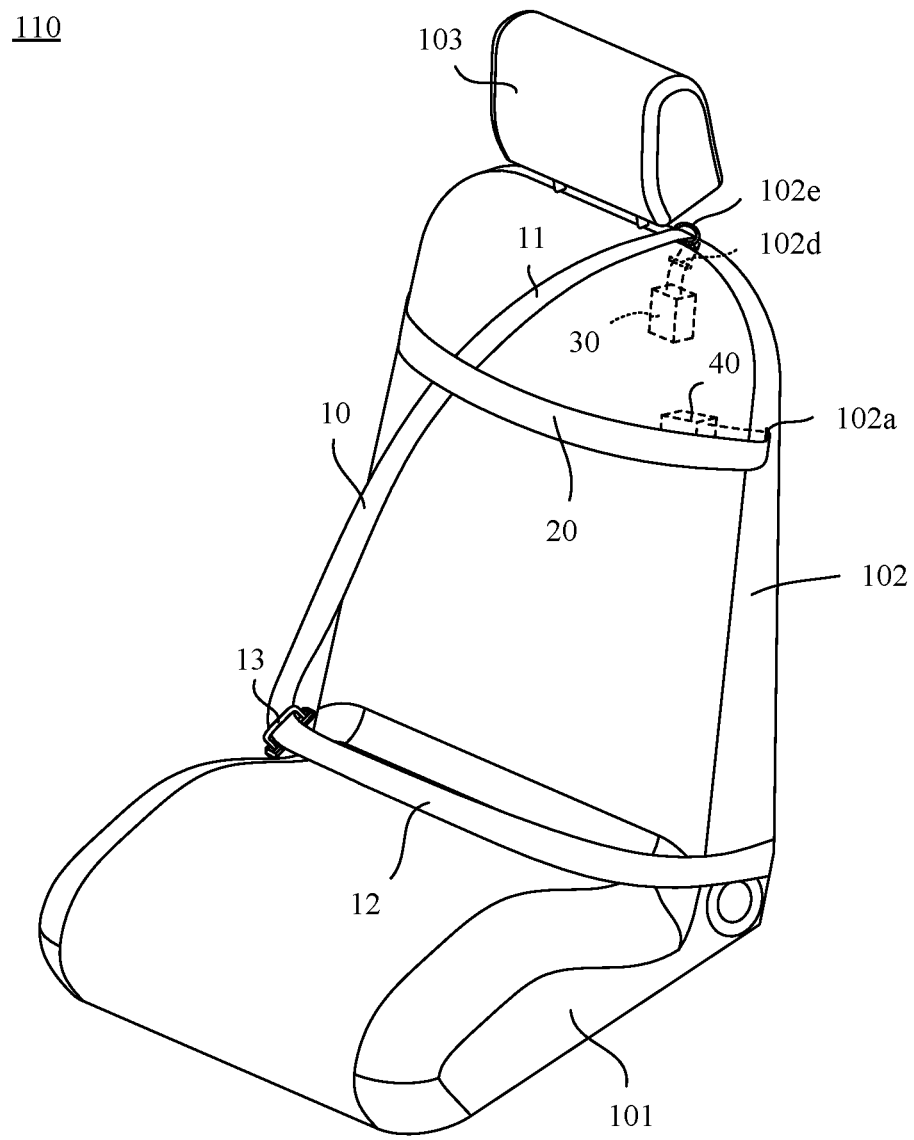
FIG. 5 is an illustrative schematic diagram of a vehicle seat according to another embodiment of this disclosure.

FIG. 5 is an illustrative schematic diagram of a vehicle seat according to another embodiment of this disclosure. A main difference between this embodiment and the embodiment shown in FIG. 3 and FIG. 4 is that in FIG. 3 and FIG. 4, the main belt 10 extends out of the backrest 102 through the opening 102b on the upper surface of the backrest 102, whereas in this embodiment, an opening 102d is provided on a rear surface of the backrest 102 of the vehicle seat 110 and the main belt extends out of the backrest 102 through the opening 102d. In addition, a guide ring 102e is disposed on the upper surface of the backrest 102, and the main belt 10 extends to the front of the backrest through the guide ring 102e and is bent and extends downwardly. In a modification of this embodiment, the guide ring 102e may be omitted.

Other structures in this embodiment are basically the same as those in the embodiments shown in FIG. 3 and FIG. 4. For the same structures, same reference numerals are added, and detailed description thereof is omitted. This is also true in the description of the following embodiments.

Figure 6:
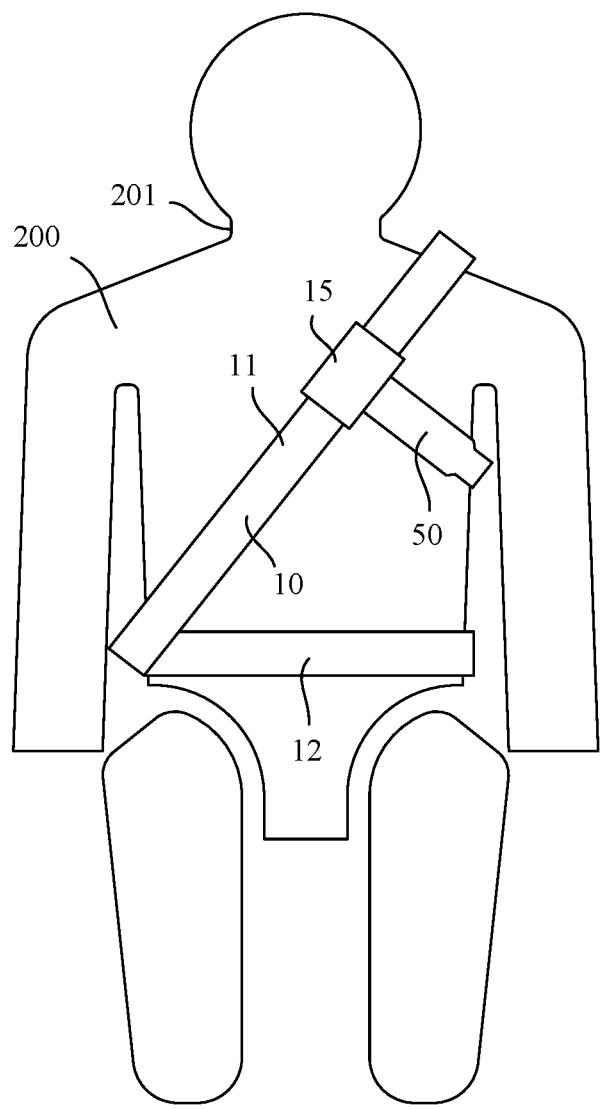
FIG. 6 is an illustrative schematic diagram of a seat belt apparatus according to another embodiment of this disclosure.
Figure 7:
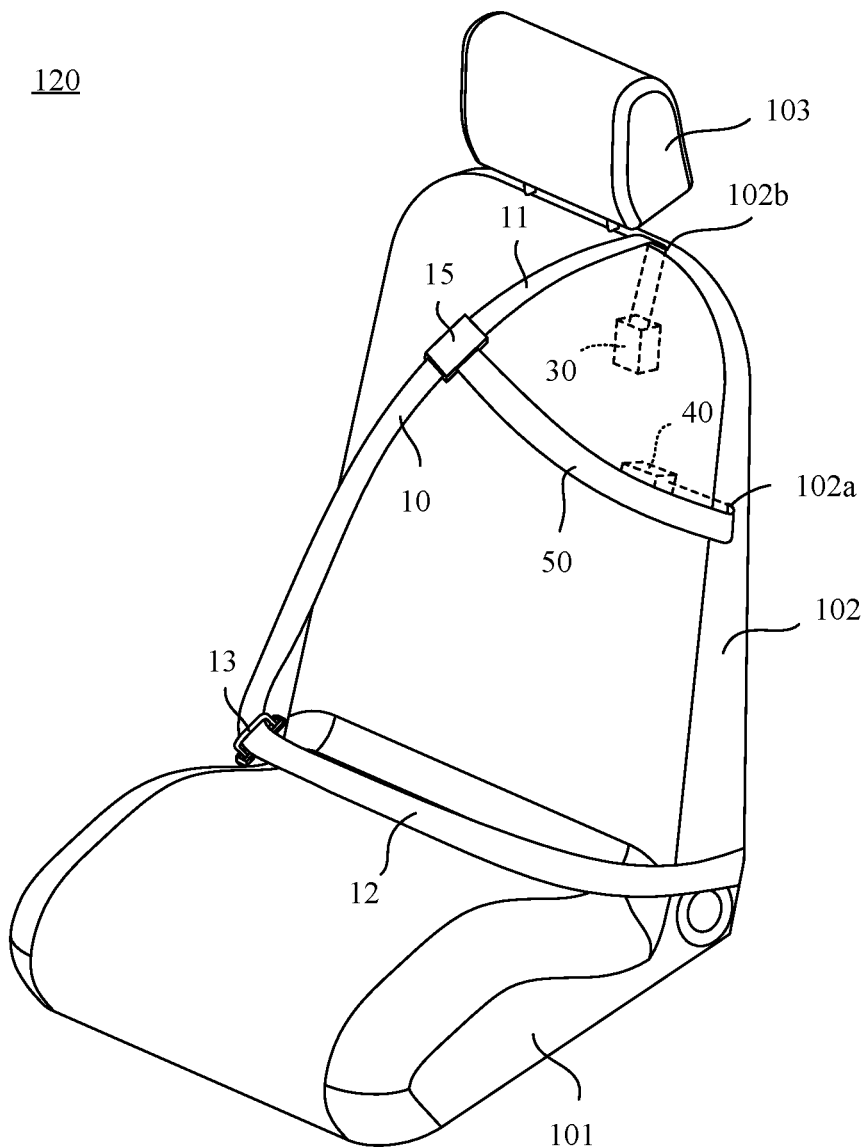
FIG. 7 is an illustrative schematic diagram of a vehicle seat according to still another embodiment of this disclosure.

FIG. 6 is an illustrative schematic diagram of a seat belt apparatus according to another embodiment of this disclosure. FIG. 7 is an illustrative schematic diagram of a vehicle seat according to still another embodiment of this disclosure. A vehicle seat 120 of this embodiment has the seat belt apparatus of the embodiment shown in FIG. 6. The vehicle seat and the seat belt apparatus are described with reference to FIG. 6 and FIG. 7.

A main difference between this embodiment and embodiments shown in FIG. 1 to FIG. 4 is that in FIG. 1 to FIG. 4, the seat belt apparatus has the auxiliary belt 20 extending horizontally from one underarm of the passenger 200 to the other underarm, to restrain the passenger 200 at both underarms, whereas in this embodiment, that seat belt apparatus has an auxiliary belt 50 for restraining the passenger at a left underarm. Further, the auxiliary belt 50 extends from a left side of the backrest 102 of the vehicle seat 120, an extended part extends forward through the left underarm of the passenger 200, and then obliquely extends to a right-upper direction, and an end of the extended part is connected to the main belt 10 through a connecting mechanism 15.

According to this structure, when a body of the passenger 200 slides forward relative to the vehicle seat in a case of a forward collision of a vehicle, the left underarm of the passenger 200 is blocked by a part of the auxiliary belt 50 disposed under the left underarm. In this way, the auxiliary belt 50 can suppress forward sliding of the passenger 200. In addition, the auxiliary belt 50 receives a force applied by the passenger 200 forward and downward. Further, the main belt 10 is pulled forward and downward, so that the main belt 10 is prevented from approaching a neck 201 of the passenger 200. This reduces a risk that the neck 201 of the passenger 200 is strangled by the main belt 10, and improves safety of the seat belt apparatus.

Optionally, the connecting mechanism 15 may have a plastic part or a metal part, and an end of the auxiliary belt 50 is clamped and fastened to the plastic part or the metal part. In another embodiment, the connecting mechanism 15 may also have a stitching part, that is, the end of the auxiliary belt 50 is stitched to the main belt 10. In this case, a reinforcing part made of webbing may be added near the stitching part to strengthen connection strength of the stitching part. In addition, the connecting mechanism 15 may also be of a snap-type structure, that is, the auxiliary belt 50 and the connecting mechanism 15 are respectively provided with snaps that match with each other, and the auxiliary belt 50 and the connecting mechanism 15 are buckled together by pressing.

In this embodiment, the auxiliary belt 50 is always connected to the main belt 10 through the connecting mechanism 15. In another embodiment, the auxiliary belt 50 may be detachably connected to the main belt 10 through a connecting mechanism, and an example of such a structure is also described in the following embodiment.

In addition, in this embodiment, the connecting mechanism 15 is always fastened to the main belt 10. In another embodiment, the connecting mechanism 15 may also be a sliding connecting mechanism that can slide on the main belt 10, and an example of such a structure is also described in the following embodiment.

In this embodiment, a tilt angle of the auxiliary belt 50 is formed, so that an included angle between the auxiliary belt 50 and the main belt 10 is approximately 90 degrees, that is, the auxiliary belt 50 approximately perpendicularly crosses the main belt 10. In this way, the main belt 10 can be pulled well, to reduce a risk that the neck 201 of the passenger 200 is strangled by the main belt 10. In another embodiment, a tilt angle of the auxiliary belt 50 relative to a horizontal direction may also be another angle. Further, an included angle formed between the auxiliary belt 50 and the horizontal direction may be set within a range of greater than 0 degrees and less than 90 degrees when the auxiliary belt 50 extends obliquely upward. 0 degrees means that the auxiliary belt 50 extends horizontally, and 90 degrees means that the auxiliary belt 50 extends vertically. Alternatively, the tilt angle of the auxiliary belt may be set within a range of 0 degrees to 80 degrees, 0 degrees to 70 degrees, 0 degrees to 60 degrees, 0 degrees to 50 degrees, or the like.

The angle of the auxiliary belt 50 may be set based on designing of a connection form with the main belt 10, a length of the auxiliary belt 50, and the like. Further, for example, the auxiliary belt 50 may be connected to the connecting mechanism 15 or the main belt 10 in an unchangeable-angle manner (for example, a clamp connection manner and a stitching connection manner described above). For another example, when the end of the auxiliary belt 50 is not connected to the retractor but fastened to the backrest 102, a length of the auxiliary belt 50 is unchangeable during use of the auxiliary belt 50. The length of the auxiliary belt 50 may be preset, to make a tilt angle of the auxiliary belt 50 during use meet the foregoing angle range.

Figure 8:
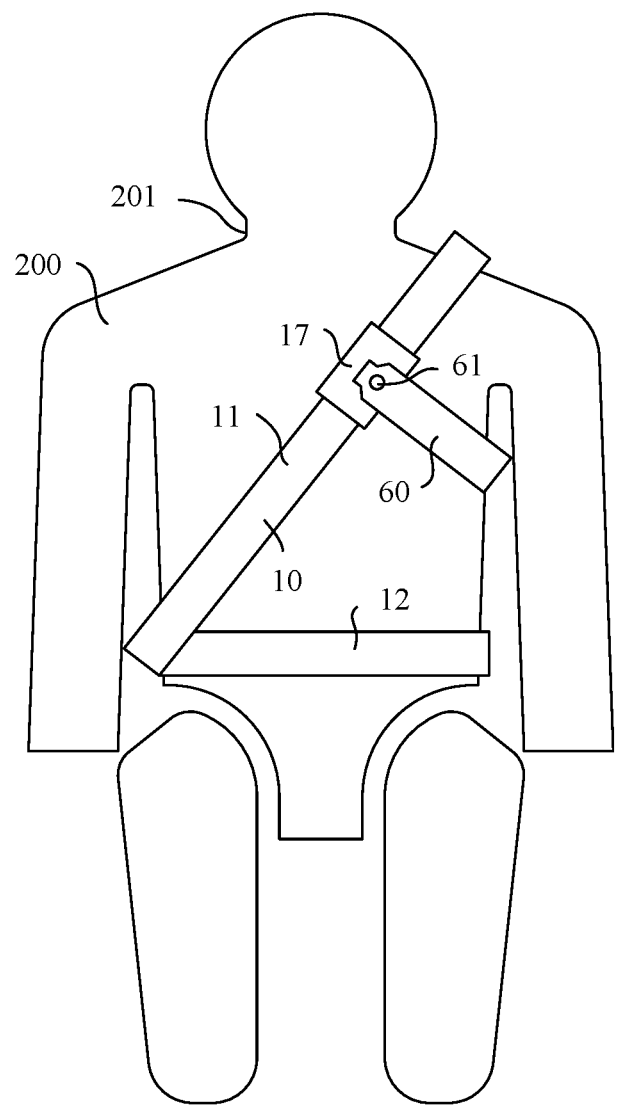
FIG. 8 is an illustrative schematic diagram of a seat belt apparatus according to still another embodiment of this disclosure.

FIG. 8 is an illustrative schematic diagram of a seat belt apparatus according to still another embodiment of this disclosure. A main difference between the embodiment shown in FIG. 8 and the embodiment shown in FIG. 6 lies in the following. In FIG. 6, the end of the auxiliary belt 50 is clamped and fastened by the connecting mechanism 15, and an included angle of the auxiliary belt 50 relative to the main belt 10 does not change during use. In this embodiment, the seat belt apparatus has an auxiliary belt 60, a buckle 61 is disposed on an end of the auxiliary belt 60, and the buckle 61 is of a snap structure. Correspondingly, a connecting mechanism 17 is disposed on the main belt 10, and a snap structure corresponding to the buckle 61 is disposed on the connecting mechanism 17. The snap structures of the buckle 61 and the connecting mechanism 17 can be buckled together (a type of buckling). In this state, an included angle of the auxiliary belt 60 relative to the main belt 10 is variable, so that the passengers 200 of different heights and body sizes can be better adapted.

In addition, in this embodiment, the connecting mechanism 17 is a sliding connecting mechanism that can slide on the main belt 10, so that passengers of different heights and body sizes can be better adapted. A specific form of the connecting mechanism 17, for example, may include a sliding sleeve made of webbing or the like, or a connecting piece made of plastic or metal. A through hole is provided in the connecting piece, so that the main belt 10 can pass through the through hole, and the connecting piece can slide on the main belt 10. In addition, the auxiliary belt 60 can be connected to the connection piece to achieve connection with the main belt 10.

Further, a locking part may be disposed on the connecting mechanism 17. When the connecting mechanism 17 slides to a desired position on the main belt 10, the position of the connecting mechanism 17 may be locked by the locking part. For example, a specific structure of the locking part may be a clamping structure, that is, the main belt 10 is clamped to lock a sliding position of the connecting mechanism 17 relative to the main belt. Alternatively, the connecting mechanism 17 may include a snap, and a plurality of corresponding snaps are disposed on the main belt 10. The connecting mechanism 17 can be locked at a plurality of sliding positions by buckling of the snaps on the connecting mechanism 17 and the main belt 10.

In addition, it is clear that other connecting mechanisms (such as the connecting mechanism 15 and connecting mechanism 16) shown in the drawings may also adopt a sliding connection structure.

Figure 9:
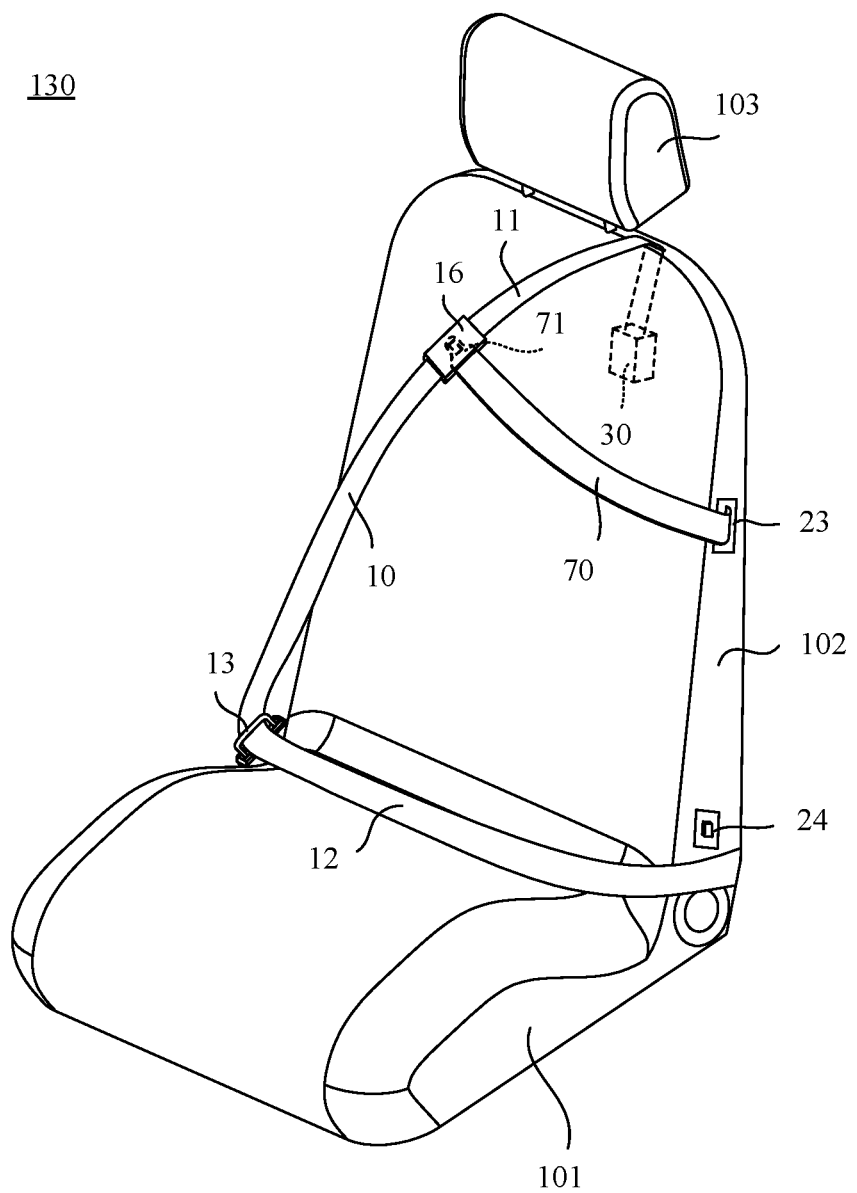
FIG. 9 is an illustrative schematic diagram of a vehicle seat according to yet another embodiment of this disclosure.

FIG. 9 is an illustrative schematic diagram of a vehicle seat according to yet another embodiment of this disclosure. There are three main differences between this embodiment and the embodiment shown in FIG. 7. First, in FIG. 7, one end of the auxiliary belt 50 is clamped and fastened to the connecting mechanism 15. However, in this embodiment, the seat belt apparatus on a vehicle seat 130 has an auxiliary belt 70. A buckle 71 is disposed on one end of the auxiliary belt 70, and the buckle 71 is of a buckle tongue structure. A connecting mechanism 16 is disposed on the main belt 10, the connecting mechanism 16 includes a fastening part matched with the buckle 71, and the fastening part is of a locking buckle structure. The fastening part is buckled and fastened to the connecting mechanism 16 by using the buckle 71, so that the auxiliary belt 70 is connected to the main belt 10 (in particular, the obliquely extending part 11 of the main belt 10).

Second, in the embodiment shown in FIG. 7, the other end of the auxiliary belt 50 is connected to the retractor 40. In this embodiment, the other end of the auxiliary belt 70 is not connected to a retractor as in the foregoing embodiment, but is fastened to the backrest 102. Further, as shown in FIG. 9, a fastening part 23 is disposed on a left side surface of the backrest 102, and an end of the auxiliary belt 70 is fastened to the fastening part 23. A position of the fastening part 23 in an up-down direction is substantially the same as that of the opening 102a (refer to FIG. 7, and the like) in the foregoing embodiment. Here, the fastening part 23 corresponds to the "second part" in this disclosure.

Third, as shown in FIG. 9, a fastening part 24 is disposed on a lower part of the left side surface of the backrest 102, and the fastening part 24 is provided with a protrusion. When the auxiliary belt 70 is not in use, the buckle 71 on the end of the auxiliary belt 70 may be buckled and fastened to the fastening part 24. Further, the protrusion on the fastening part 24 is embedded in a through hole on the buckle tongue of the buckle 71, so that the buckle 71 is buckled and fastened to the fastening part 24. On this basis, or as a substitute, the buckle 71 includes a metal part (for example, the buckle tongue is made of metal), and the fastening part 24 may include a magnetic body that can absorb the metal part (for example, the buckle tongue) of the buckle 71 by using a magnetic force, to fix a position of the buckle 71.

According to the foregoing structure, the end of the auxiliary belt 70 can be fastened to the backrest 102 when the auxiliary belt 70 is not in use. For example, this can prevent the auxiliary belt 70 from being entangled with the main belt 10.

In this embodiment, the fastening part 24 is disposed on the backrest 102 for buckling and fastening to the buckle 71. However, a fastening part for buckling and fastening to the buckle 71 may be disposed at another position. For example, a part on a left side surface of the cushion 101 near the backrest 102, a left lower part of a rear surface of the backrest 102, or the like. These parts belong to a lower left side of the vehicle seat.

Figure 10:
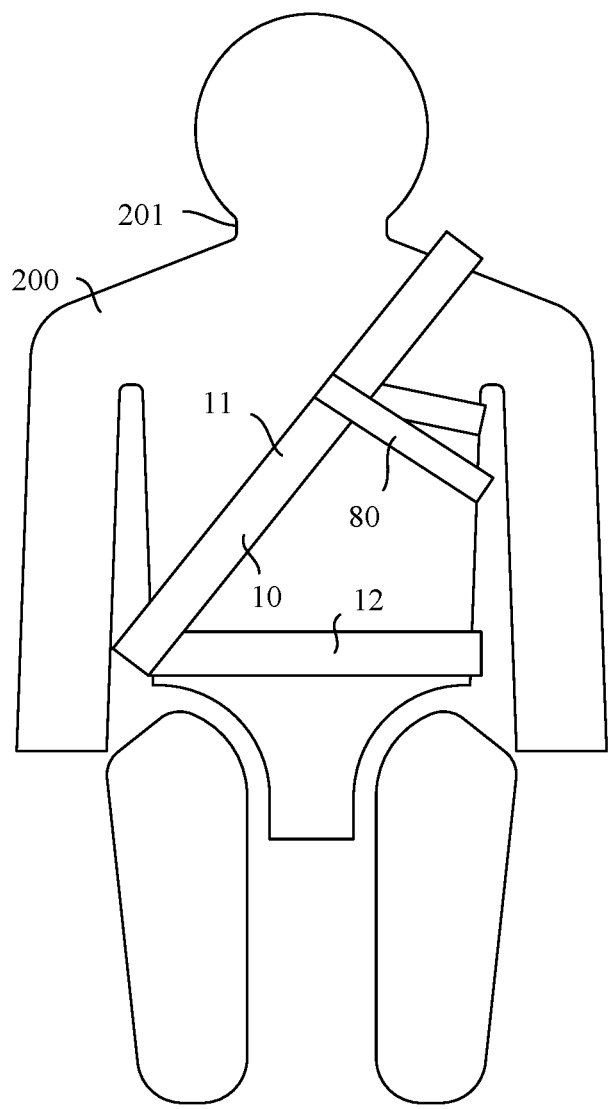
FIG. 10 is an illustrative schematic diagram of a seat belt apparatus according to yet another embodiment of this disclosure.
Figure 11:
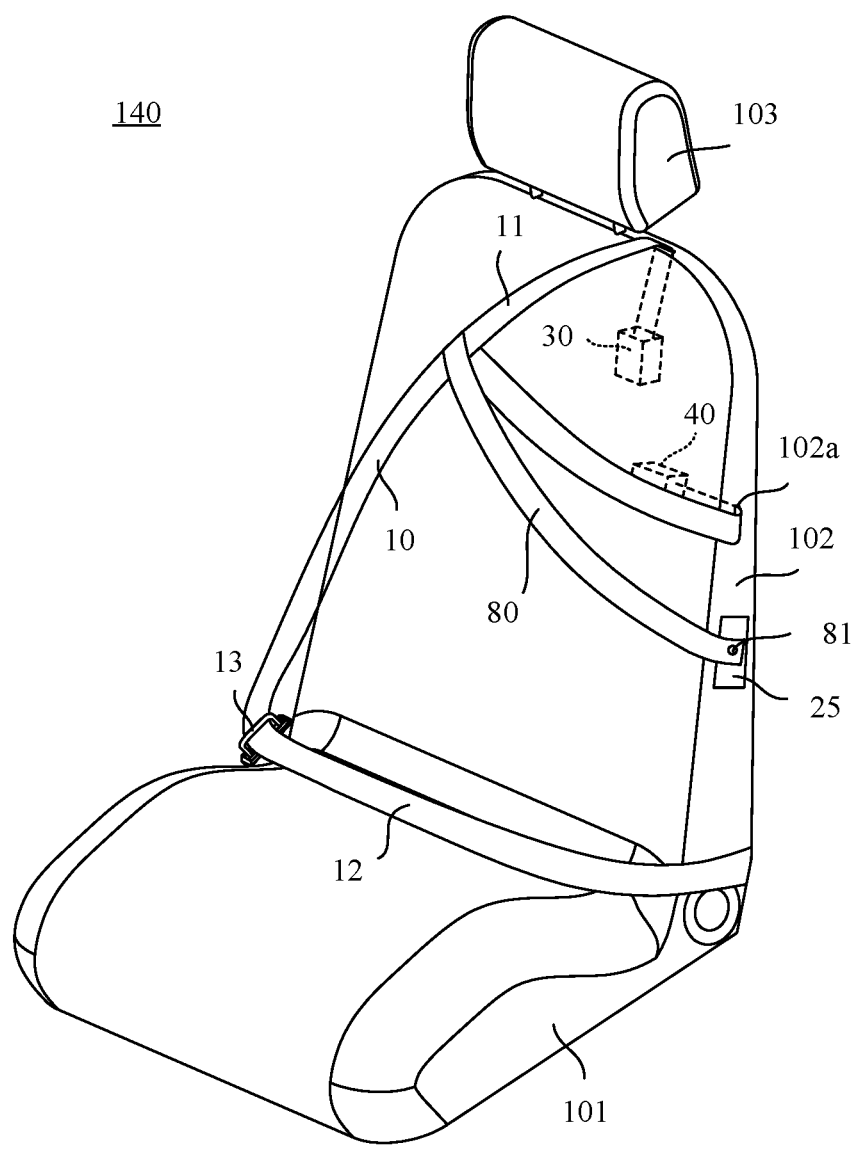
FIG. 11 is an illustrative schematic diagram of a vehicle seat according to an embodiment of this disclosure.

FIG. 10 is an illustrative schematic diagram of a seat belt apparatus according to yet another embodiment of this disclosure, and FIG. 11 is an illustrative schematic diagram of a vehicle seat according to an embodiment of this disclosure. The vehicle seat includes the seat belt apparatus shown in FIG. 10. The seat belt apparatus and the vehicle seat are described with reference to FIG. 10 and FIG. 11.

A main difference between embodiments shown in FIG. 10 and FIG. 11 and embodiments shown in FIG. 6 and FIG. 7 lies in the following. In FIG. 6 and FIG. 7, the auxiliary belt 50 is connected to the main belt 10 through the specially disposed connecting mechanism 15. However, in this embodiment, an auxiliary belt 80 extends from a side of the backrest 102 of a vehicle seat 140 to the main belt 10, and then is folded back around the main belt 10, and an end of a folded-back part is fastened to the backrest 102. Thus, the auxiliary belt 80 is connected to the main belt 10 through the folded-back part. Therefore, the specially disposed connecting mechanism can be omitted, to reduce manufacturing costs.

In addition, a fastening part 25 is disposed at a position that is slightly lower than that of the opening 102a and that is on a left side surface of the backrest 102, and a buckle 81 is disposed at an end (or a free end) of a part that is of the auxiliary belt 80 and that extends out of the backrest 102. The buckle 81 is buckled and fastened to the fastening part 25, so that the free end of the auxiliary belt 80 can be fastened to the backrest 102. In addition, in this embodiment, a buckling structure between the buckle 81 and the fastening part 25 is a snap structure.

Figure 12:
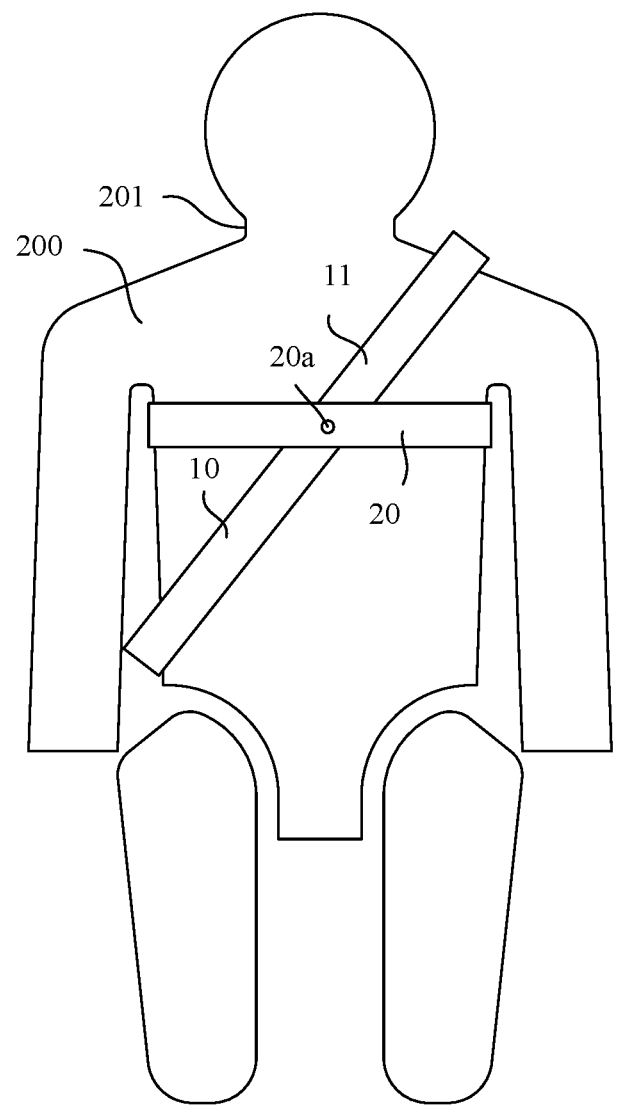
FIG. 12 is an illustrative schematic diagram of a seat belt apparatus according to an embodiment of this disclosure.

FIG. 12 is an illustrative schematic diagram of a seat belt apparatus according to an embodiment of this disclosure. A difference between the embodiment shown in FIG. 12 and embodiments shown in FIG. 1 and FIG. 2 is mainly that a buckle 20a is disposed between two ends of the auxiliary belt 20, and correspondingly, a fastening part is disposed on the main belt 10. The buckle 20a can be buckled and fastened to the fastening part. Thus, the auxiliary belt 20 is connected to the main belt 10 at a position between the two ends, and a torso of the passenger 200 can be more reliably restrained. In this embodiment, a buckling structure between the buckle 20a and the main belt 10 is a snap structure.

In addition, in this embodiment, the main belt 10 has the obliquely extending part 11 but does not have a waist-abdomen restraining part, that is, an end of a part that is of the main belt 10 and that extends from a left upper part of a backrest of the vehicle seat is not fastened to a left lower part of the backrest when the main belt 10 is used. Instead, the end of a part that is of the main belt 10 and that extends from a left upper part of a backrest of the vehicle seat can be fastened to a right lower part of the backrest. A fastening manner of the backrest may be the same as that described in the foregoing embodiment, for example, a buckle tongue and locking buckle manner.

Figure 13:
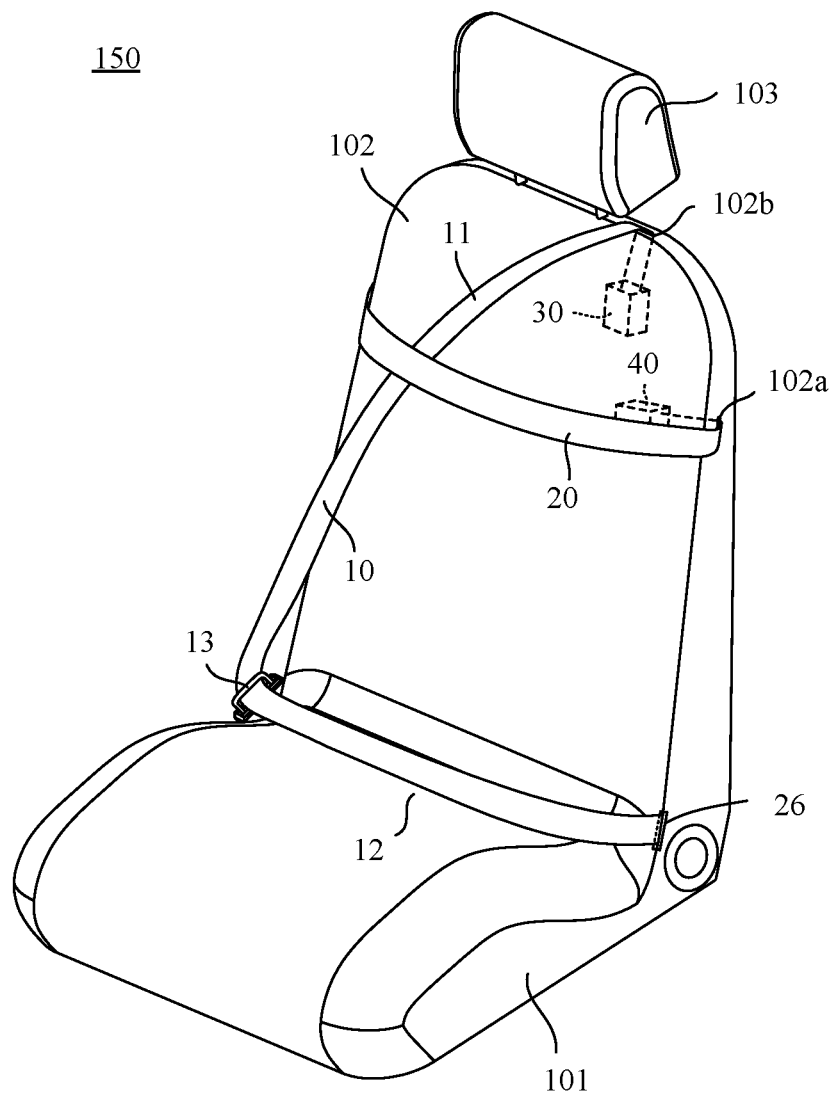
FIG. 13 is an illustrative schematic diagram of a vehicle seat according to an embodiment of this disclosure.

FIG. 13 is an illustrative schematic diagram of a vehicle seat according to an embodiment of this disclosure. A difference between the embodiment shown in FIG. 13 and the embodiment shown in FIG. 3 is that in this embodiment, a fastening part 26 is disposed at a junction of a lower part of a left side surface and a lower part of a front surface of the backrest 102 of a vehicle seat 150, and an end of a part that is of the main belt 10 and that extends through the opening 102b is fastened to the fastening part 26. A specific fastening manner may be stitching fastening and/or clamping fastening.

Some embodiments of this disclosure are described above. However, this disclosure is not limited to these embodiments. Various changes may be made to the foregoing embodiments without departing from a scope of a technical concept of this disclosure. These changes also fall within the protection scope of this disclosure.

For example, in the foregoing embodiment, the opening 102b is disposed on the upper surface of the backrest 102, and the main belt 10 extends upward and forward through the opening 102b. However, an opening may also be disposed on a front surface of the upper part of the backrest 102, and the main belt 10 extends forward from the inside of the backrest or a rear side of the backrest through the opening. In addition, for example, an opening may be disposed on a front part of a left side surface of a headrest or a front surface part of a left side of the headrest, and the main belt 10 extends out of the backrest 102 through the opening. Further, an opening may be disposed at a position that is higher than that of the opening 102a and that is on a left side surface of the backrest 102, and the main belt 10 extends out of the backrest 102 through the opening.

What is claimed is:

1. A seat belt apparatus comprising:
a first belt configured to extend from a first part of a first upper part of a vehicle seat, wherein the first part is located on a first side in a width direction of the vehicle seat;
a first buckle disposed on a third part that is of the first belt and that is configured to extend from the first part, wherein the first buckle is adapted to be buckled to a first fastening part that is disposed on a first lower part of a second side in the width direction; and
a second belt configured to extend from a second part of a backrest of the vehicle seat, wherein the second part is located on a second upper part of the backrest on the first side and is lower than the first part.

2. The seat belt apparatus of claim 1, further comprising a second buckle disposed on a fourth part that is of the second belt and that extends from the second part, wherein the second buckle is adapted to be buckled to a second fastening part disposed on the second side of the backrest and having a same height as the second part.

3. The seat belt apparatus of claim 2, further comprising a connecting mechanism configured to couple the first belt and the second belt.

4. The seat belt apparatus of claim 1, further comprising a connecting mechanism configured to couple the first belt and the second belt.

5. The seat belt apparatus of claim 4, wherein the connecting mechanism is further configured to slide on the first belt.

6. The seat belt apparatus of claim 5, wherein the connecting mechanism comprises a locking part configured for locking a sliding position of the connecting mechanism relative to the first belt.

7. The seat belt apparatus of claim 1, wherein the first belt and the second belt are configured to be detachably coupled.

8. The seat belt apparatus of claim 1, wherein the first side is located proximate to a window and the second side is located distal from the window.

9. The seat belt apparatus of claim 1, wherein an end of the third part is configured to fasten to a fourth part of the vehicle seat that is located on a second lower part of the first side.

10. The seat belt apparatus of claim 1, further comprising a first retractor configured to dispose in the vehicle seat for fastening an end of the first belt.

11. The seat belt apparatus of claim 1, further comprising a second retractor configured to dispose in the vehicle seat for fastening an end of the second belt.

12. The seat belt apparatus of claim 11, wherein the second belt is configured to extend out of the vehicle seat from a side surface on the first side or a fourth part that is on a back surface and that is proximate to the side surface.

13. The seat belt apparatus of claim 1, wherein the second belt is configured to extend obliquely upward from the first side to the second side at an included angle with a horizontal direction greater than zero degrees and less than 90 degrees in a wearing position.

14. The seat belt apparatus of claim 13, wherein the included angle falls within a range of zero degrees to 70 degrees.

15. The seat belt apparatus of claim 1, wherein the second belt is configured to extend from the first side to the first belt and fold back around the first belt, and wherein the second belt comprises a folded-back end configured to fasten to the backrest.

16. A vehicle seat comprising:
a first upper part;
a first side in a width direction of the vehicle seat;
a first part located on the first upper part and on the first side;
a second side in the width direction comprising a lower part;
a first fastening part that is disposed on the lower part;
a backrest comprising a second upper part located on the first side;
a second part located on the second upper part and lower than the first part; and
a seat belt apparatus comprising:
a first belt configured to extend from the first part;
a first buckle configured to be buckled to the first fastening part; and
a second belt configured to extend from the second part.

17. The vehicle seat of claim 16, further comprising:
a second buckle disposed on a fourth part of the second belt; and
a second fastening part disposed on the second side, having a same height as the second part, and configured to buckle and fasten the second buckle.

18. The vehicle seat of claim 16, further comprising a second fastening part disposed on the first side and configured to fasten an end of a third part that is of the second belt and that extends from the second part.

19. The vehicle seat of claim 16, wherein the first belt comprises a third part, and wherein the first buckle is disposed on the third part.

20. A vehicle comprising:
- a vehicle seat comprising:
  - a first upper part;
  - a first side in a width direction of the vehicle seat;
  - a first part located on the first upper part and on the first side;
  - a second side in the width direction comprising a lower part;
  - a fastening part that is disposed on the lower part;
  - a backrest comprising a second upper part located on the first side; and
  - a second part located on the second upper part and lower than the first part; and
- a seat belt apparatus comprising:
  - a first belt extending from the first part and comprising a third part extending from the first part;
  - a buckle disposed on the third part and configured to be buckled to the fastening part; and
  - a second belt extending from the second part.

* * * * *